(12) United States Patent
Mack

(10) Patent No.: US 7,480,031 B2
(45) Date of Patent: Jan. 20, 2009

(54) SCANNER

(75) Inventor: Stefan Mack, Freiburg (DE)

(73) Assignee: Sick AG, Waldrick (DE)

( * ) Notice: Subject to any disclaimer, the term of this patent is extended or adjusted under 35 U.S.C. 154(b) by 102 days.

(21) Appl. No.: 11/810,958

(22) Filed: Jun. 6, 2007

(65) Prior Publication Data

US 2008/0238760 A1 Oct. 2, 2008

(30) Foreign Application Priority Data

Jun. 10, 2006 (DE) .................. 10 2006 027 063

(51) Int. Cl.
*G01C 3/08* (2006.01)
*G02B 26/08* (2006.01)
(52) U.S. Cl. ............... 356/5.01; 356/4.07; 359/204
(58) Field of Classification Search ............. 356/4.01, 356/4.07, 5.01; 359/196, 197, 204
See application file for complete search history.

(56) References Cited

U.S. PATENT DOCUMENTS

| 5,760,886 | A  | * | 6/1998  | Miyazaki et al. | ......... | 356/5.01 |
| 6,262,800 | B1 | * | 7/2001  | Minor           | ......... | 356/139.07 |
| 6,650,235 | B2 | * | 11/2003 | Shirai et al.   | ......... | 340/435 |
| 7,443,555 | B2 | * | 10/2008 | Blug et al.     | ......... | 359/196 |
| 2003/0123045 | A1 | * | 7/2003 | Riegl et al.   | ......... | 356/4.01 |
| 2005/0168720 | A1 | * | 8/2005 | Yamashita et al. | ....... | 356/4.01 |

FOREIGN PATENT DOCUMENTS

| DE | 22 16 765 B2  | 11/1972 |
| DE | 43 40 756 A1  | 6/1994  |
| DE | 195 23 528 A1 | 2/1996  |
| EP | 1 795 913 A2  | 6/2007  |
| GB | 2228338 A *   | 8/1990  |

* cited by examiner

*Primary Examiner*—Isam Alsomiri
(74) *Attorney, Agent, or Firm*—Townsend and Townsend and Crew, LLP

(57) ABSTRACT

A laser radar device that operates on an elapsed time basis and has a pulsating laser for emitting successive light pulses into a monitored region. A light receiver receives light impulses reflected by an object in the monitored region and generates electrical signals responsive to the received light impulses. The signals are forwarded to an evaluation unit adapted to generate a distance signal indicative of a distance between the object and the laser radar device on the basis of the speed of light and an elapsed time between the emission of the light pulses and the receipt of the reflected light pulses. A light diverter located between the laser and the monitored region continuously varies the directionality of the light impulses directed into the monitored region and includes a beam splitter that divides the energy of the emitted light pulses into a main beam and a sensing beam. The beam splitter causes a constant angular offset between the main beam and the sensing beam in the direction in which the directionality of the light beams is varied. A further light receiver is provided for receiving light impulses from the sensing beam reflected by the object.

9 Claims, 1 Drawing Sheet

SCANNER

RELATED APPLICATIONS

This application is based on and claims the priority of German patent application 102006027063.0 filed Jun. 10, 2006, which is incorporated herein by reference.

BACKGROUND OF THE INVENTION

This invention relates to a laser radar device that operates on an elapsed time basis and has a pulsating laser for emitting successive light pulses into a monitored region, a light receiving arrangement for receiving light impulses reflected by an object in the monitored region, and an evaluation unit that generates a distance signal indicative of a distance between the object and the laser radar device.

Such laser radar devices are known from German patent document DE 43 40 756 A1. The laser radar device disclosed therein has a pulsed laser which directs successive light pulses into a monitoring region. A light receiving arrangement detects light pulses that are reflected by an object located in the monitoring region and sends corresponding electrical signals to an evaluation unit. The evaluation unit generates a distance signal that is indicative of a distance between the object and the laser radar device on the basis of the speed of light and an elapsed time between the emission and the receipt of the light pulses. A light diverter is arranged between the pulsed laser and the monitoring region and continuously changes the orientation of the light pulses through the monitored region so that the entire monitored region will be illuminated.

Laser radar devices of this type have a variety of uses. They are particularly useful for detecting objects within a danger zone. In view of the ability of such laser radar devices to determine distances, it is possible to both detect the presence of an object and to provide distance information, which, when combined with the measured rotational angle of the light diverter, allows one to determine the precise position of the object.

The word "light" as used herein is not limited to visible light. The word "light" is intended to generally cover electromagnetic beams, such as UV-light, IR-light, as well as visible light, which are typically used in optoelectronic sensors.

A disadvantage of the known state of the art is encountered when such laser radar devices monitor large monitoring regions to detect objects with widely differing reflection characteristics. Such prior art laser radar devices therefore normally have a permanent, exceedingly high signal dynamic in the light receiving arrangement, including the subsequent signal processing. Such a high signal dynamic leads to relatively high production costs. It can also lead to a malfunctioning of the laser radar device. Reasons for such malfunctioning can for example be external interfering light sources which are in the immediate vicinity of the monitoring region so that stray light from them can affect the light receiving arrangement of the laser radar device. This can significantly interfere with the light receiving arrangement, the detection sensitivity of which must be set for the lowest expected signals received from dark objects in the monitoring region, because such interfering light sources generate significant amounts of stray light or background noise that becomes superimposed onto the measurement signal. The same problem is encountered when light pulses emitted by the laser radar device are reflected by an object that has a high reflectivity and is located in the immediate vicinity of the laser radar device. The high energy received signals cause saturation effects or noise interference which can significantly degrade the accuracy of the distance measurement. The prior art tried to overcome these problems for optoelectronic sensors by suppressing the interference and, for example, taking multiple measurements from which average values are derived. It is also known to repeat inaccurate measurements by changing the detection sensitivity of the light receiving arrangement. However, this approach is not usable with laser radar devices that change direction of the emitted light because successive light pulses involve changes in the beam directions so that different objects or object portions which are unrelated to each other would provide incompatible outputs.

This could be reduced by correspondingly reducing the light deflections. However, this is not feasible because the responsiveness of the laser radar device would correspondingly decrease.

BRIEF SUMMARY OF THE INVENTION

It is therefore an object of the present invention to provide an elapsed time laser radar device in which the detection sensitivity of the laser detection device is adjusted for differences in the reflection characteristics of the object in a manner so that the sensitivity adjustments do not affect the responsiveness of the laser radar device.

In accordance with the present invention, the light diverter of the laser radar device includes an optical beam splitter which divides the light pulses from the pulsed laser into a main beam and a sensing beam. In addition, the beam splitter generates a constant angular separation or spacing between the main beam and the sensing beam in the direction in which the diverter changes the direction of the light pulses. The light receiving arrangement of the laser radar device has an additional light receiving element for receiving the light impulses of the sensing beam that were reflected by the object.

An advantage of the present invention is that the detection sensitivity along the path of the main stream can be adjusted in dependence on the light intensity of the sensing beam received by the light receiving element. With the reflection measurement from the sensing beam, the actual detection sensitivity of the main beam can be adjusted so that the amount of light of the main beam reflected by the object and received by the light receiving element for the main beam is within an optimal operating range for the light receiving arrangement. A particular advantage of the laser radar device of the present invention is that the sensing beam and main beam establish parallel operating measurement systems. This provides advance notice of the anticipated reflection for the main beam without reducing the responsiveness of the laser radar device.

In a preferred embodiment of the invention, the detection sensitivity for the path of the main beam can be adjusted by appropriately varying a switching threshold and/or an amplification factor in the electrical evaluation unit of the light receiving arrangement that is associated with the main beam. By adjusting the anticipated reflection values to the detection sensitivity of the laser radar device, it becomes possible to render the device less sensitive to interfering influences caused, for example, by other light sources.

In another advantageous embodiment of the invention, the voltage of an APD (avalanche photo diode) in the light receiving arrangement for the main beam is adjusted depending on the strength of the signal received by the light receiving element associated with the sensing beam. This reduces the influence of stray light and the like on the laser radar device. It further provides improved temperature compensation for the APD. This also improves the measurement accuracy in the case of high reflection values because the subsequent electrical evaluation unit will be less overloaded.

In a further embodiment of the present invention, an electrical control for the pulsed laser is adapted to adjust the initial energy of the emitted light pulses as a function of the signal strength previously determined with the sensing beam. By conforming the energy of the pulsed laser to the prevailing conditions, its output energy is kept at a level no greater than necessary. This significantly lengthens the life span of the pulsed laser.

In accordance with another feature of the present invention, the optical beam splitter associated with the light diverter of the laser radar device is arranged so that only a very small portion of the energy of the light pulses from the pulsed laser is fed to the sensing beam. According to a preferred embodiment of the present invention, the sensing beam receives only about 1% of the pulse energy emitted by the pulsed laser so that the strength of the main beam is only very slightly reduced. In other words, the reduction of the sensitivity of the laser radar device is practically unaffected by the formation of the separate sensing beam.

In a particularly preferred embodiment of the invention, the angular separation between the advanced sensing beam and the trailing main beam is exactly the same as the angular separation between two successive light pulses of the main beam. In this manner, it is assured that the light impulses of the trailing main beam proceed in exactly the same direction as the light impulses of the preceding sensing beam. This assures an optimal prediction of the anticipated reflection for the main beam because both the sensing beam and the main beam will strike a detected object at the same location on the object.

It is advantageous to construct the optical beam element for separating the sensing beam from the main beam as an optical diffraction screen on which, for example, the sensing beam is subjected to a first diffraction order while the main beam has a zero diffraction. It is advantageous to construct the optical beam splitter as a diffraction screen because this facilitates the determination of the energy distribution or the diffraction angle between, for example, the first and the zero order, that is, between the sensing beam and the main beam.

As an alternative, the beam splitter for separating the sensing beam from the main beam can be a wedge-shaped back surface mirror. This embodiment is particularly advantageous when costs must be kept low, because it only requires a substitution of a wedge angle between the front surface and the back surface of a back surface mirror for the rotating mirror of the light diverter.

DESCRIPTION OF THE PREFERRED EMBODIMENTS

Figure 1:
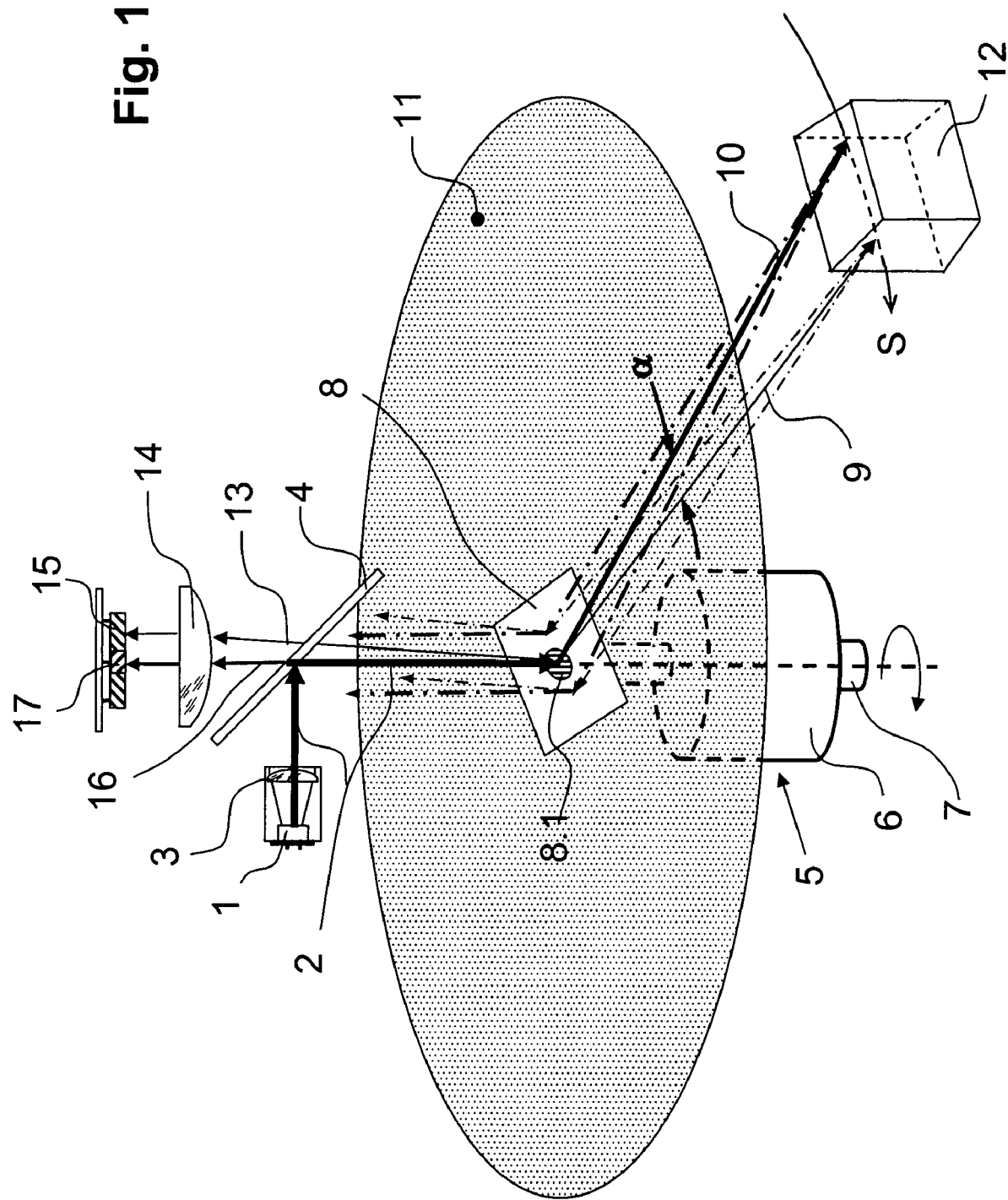
FIG. 1 is a schematic, perspective view of a laser radar device making use of a main beam and a sensing beam.

Pulsed laser 1 emits a light beam 2 in the form of successive light pulses. To affect the light beam characteristics, a projecting objective 3 is provided. After the light beam leaves projecting objective 3, light beam 2 is diverted by a partial mirror 4 which is aligned with the axis of rotation of a light diverter 5. FIG. 1 illustrates that light diverter 5 has a motor 6, which has a motor shaft 7, and a rotating mirror 8 that rotates about the axis of shaft 7 and is inclined by an angle of 45°. A beam splitter in the form of a diffraction screen or grating 8.1 is coupled to rotating mirror 8. The diffraction screen is preferably fitted to the cross-section of light beam 2. The diffraction screen divides the light beam that was deflected 90° by rotating mirror 8 into two partial beams, namely a sensing beam 9 and a main beam 10. Diffraction screen 8.1 is dimensioned so that the predominant energy of light beam 2 establishes the main beam 10. Only a small proportion of the beam is used to establish sensing beam 9. The rotation of motor shaft 7 continuously changes the direction of sensing beam 9 and main beam 10. As a result of this motion in scan direction S, sensing beam 9 and main beam 10 form a scanning plane 11 which has as its center the axis of rotation of light diverter 5. The dimensioning of diffraction screen 8.1 determines an advance angle α between sensing beam 9 and main beam 10 which extends in the direction of scanning plane 11. When light diverter 5 moves sensing beam 9 and main beam 10 in scanning direction S, the sensing beam 9 initially reaches an object 12 that may be present. When sensing beam 9 strikes object 12, light is reflected to a greater or lesser extent as a function of the surface characteristics of the object. A portion of the reflected light is reflected back almost onto itself and strikes rotating mirror 8 as an oppositely directed, slightly diverging diffraction cone. As a result of this diffraction, the reflected sensing beam fully illuminates diffraction screen 8.1 so that the reflected sensing beam 13 practically reaches partial mirror 4 only via rotating mirror 8. The diffraction of the emitted sensing beam 9 by screen 8.1 results in an additional change in direction, and the reflected diffraction cone has a corresponding angular deviation relative to light beam 2. Partial mirror 4 is configured so that a part of the reflected sensing beam 13 is received without directional change on a ring-shaped periphery of receiving optics 14. Further, receiving optics 14 focuses the reflected sensing beam 13 on a ring-shaped light receiving element 15. An evaluation unit, not shown in FIG. 1, is arranged downstream of light receiving element 15 and determines the magnitude of the light energy received by ring-shaped light receiving element 15. The light energy determined in this manner strongly depends on the distance of object 12 to the laser radar unit. If the object is at a large distance from the laser radar unit, the light energy received by light receiving element 15 will be less than if the same object is located more closely to the laser radar unit. A similar dependence of the light energy received by light receiving element 15 is caused by the reflection characteristics of object 12. For example, the light energy received by light receiving element 15 from a sensing beam 9 that strikes a white surface is many times larger than the light energy from a sensing beam 9 that was reflected by a rough, dark surface of the object.

As light diverter 5 rotates, main beam 10 strikes object 12 after sensing beam 9. Similar to the reflection of sensing beam 9 by the surface of object 12, main beam 10 is reflected by the object surface at a slightly later moment in time. Thus, a part of main beam 10 that strikes object 12 is reflected and reaches rotating mirror 8 in the form of a lightly divergent diffraction cone. Here too, diffraction screen 8.1 is fully illuminated so that the diffraction cone of the reflected main beam 10 is practically fully diverted by rotating mirror 8 to receiving optics 14. Contrary to the reflected sensing beam 13, the emitted main beam 10 is not further deflected by diffraction screen 8.1. As a result, the reflected main beam has no angular deviation relative to light beam 2. The reflected main beam 16 therefore strikes a central area of receiving optics 14. In view thereof, the reflected main beam 16 is focused on a centrally located light receiving element 17. The signal generated by central light receiving element 17 is also fed to the evaluation unit. The light energy of main beam 16 is also dependent on the distance of the object and its reflection characteristics.

Such a large range in the light energy on light receiving element 17 can limit the measurement accuracy by the evaluation unit. As a result, the determination of the time interval between the emittance of a light impulse from pulsed laser 1 and the receipt of the light impulse following its reflection by object 12 might be inaccurate. For example, the distance signal concerning the distance of the object to the laser radar unit might contain errors. To avoid such errors in the determination of distance with the main beam, the measurement results from sensing beam 9 are used to deduce therefrom the anticipated reflection characteristics for main beam 16. For example, the strength of the next light impulse emitted by the pulsed laser can be selected based on a reflection prognosis determined with sensing beam 9 to keep the prevailing light energy at light receiving element 17 in the optimum working range of the light receiving arrangement.

The invention claimed is:

1. A laser radar device operating on an elapsed time basis comprising
    a pulsating laser for emitting successive light pulses into a monitored region,
    a light receiving arrangement for receiving light impulses reflected by an object in the monitored region, generating electrical signals responsive to the received light impulses, and forwarding the signals to an evaluation unit, the evaluation unit being adapted to generate a distance signal indicative of a distance between the object and the laser radar device on the basis of the speed of light and an elapsed time between the emission of the light pulses and the receipt of the reflected light pulses,
    a light diverter located between the laser and the monitored region for continuously varying a directionality of the light impulses directed into the monitored region, the light diverter including a beam splitter for dividing an energy of the emitted light pulses into a main beam and a sensing beam, the beam splitter being adapted to cause a constant angular offset between the main beam and the sensing beam in the direction in which the directionality of the light beams is varied, and
    a further light receiver for receiving light impulses from the sensing beam reflected by the object.

2. A laser radar device according to claim 1 including a signal processor in communication with the light receiving arrangement for the main beam adapted to adjust a light detection sensitivity of the light receiving arrangement in dependency on a measured strength of the light impulses received by the further light receiver.

3. A laser radar device according to claim 1 wherein the light receiving arrangement is adapted to strengthen an avalanche photo diode in dependency on a measured strength of the sensing beam received by the further light receiver.

4. A laser radar device according to claim 1 including a control unit associated with the pulsating laser and adapted to adjust a beginning power of the emitted light pulses in dependency on a measured strength of the sensing beam received by the further light receiver.

5. A laser radar device according to claim 1 wherein the beam splitter is adapted to direct only a minor part of an energy of the emitted light pulses to the sensing beam.

6. A laser radar device according to claim 5 wherein the minor part of the emitted light pulse energy diverted by the beam splitter is less than 1% of the emitted light pulse energy.

7. A laser radar device according to claim 1 wherein the beam splitter causes the formation of an angle between the sensing beam and the main beam which is of the same size as the angle between the sensing beam and the main beam caused by the light diverter.

8. A laser radar device according to claim 1 wherein the beam splitter for separating the sensing beam and the main beam comprises an optical diffraction screen.

9. A laser radar device according to claim 1 wherein the beam splitter for separating the sensing beam and the main beam associated with the light diverter comprises a wedge-shaped back surface mirror.

* * * * *